(12) United States Patent
Jung et al.

(10) Patent No.: US 9,531,467 B2
(45) Date of Patent: Dec. 27, 2016

(54) OPPORTUNISTIC DOWNLINK INTERFERENCE ALIGNMENT

(71) Applicant: Industry-Academic Cooperation Foundation Gyeongsang National University, Jinju-si (KR)

(72) Inventors: Bang Chul Jung, Tongyeong-si (KR); Won Yong Shin, Yongin-si (KR); Hyun Jong Yang, Ulju-gun (KR); Jae Joon Park, Seo-gu (KR); Kwang Jae Lim, Yuseong-gu (KR); Jae Sun Cha, Yuseong-gu (KR); Eun Kyung Kim, Yuseong-gu (KR); Hyun Lee, Yuseong-gu (KR); Sung Cheol Chang, Yuseong-gu (KR)

(73) Assignee: INDUSTRY-ACADEMIC COOPERATION FOUNDATION GYEONGSANG NATIONAL UNIVERSITY GAJWA-DONG, Jinju-si (KR)

( * ) Notice: Subject to any disclaimer, the term of this patent is extended or adjusted under 35 U.S.C. 154(b) by 4 days.

(21) Appl. No.: 14/581,430

(22) Filed: Dec. 23, 2014

(65) Prior Publication Data
US 2015/0181611 A1 Jun. 25, 2015

(30) Foreign Application Priority Data
Dec. 23, 2013 (KR) ........................ 10-2013-0161774

(51) Int. Cl.
*H04B 7/08* (2006.01)
*H04W 28/04* (2009.01)
(Continued)

(52) U.S. Cl.
CPC ............ *H04B 7/086* (2013.01); *H04B 7/0413* (2013.01); *H04B 7/0617* (2013.01);
(Continued)

(58) Field of Classification Search
CPC .. H04W 72/082; H04W 28/04; H04W 28/048; H04W 72/055; H04W 72/1231; H04B 7/0413; H04B 7/086; H04B 7/0617; H04B 7/0619; H04B 7/0632; H04B 15/00; H04B 2215/00; H04L 27/2691
(Continued)

(56) References Cited

U.S. PATENT DOCUMENTS

2004/0067756 A1* 4/2004 Wager ..................... H04J 13/16
455/450
2009/0131068 A1* 5/2009 Wu .................... H04W 72/1231
455/452.2
(Continued)

OTHER PUBLICATIONS

Jeon et al.; "A Study on the Network Coordinated Opportunistic Beamforming in Downlink Cellular Networks"; Dankook University, Gyeongsang National University; 2012, pp. 410-411.
(Continued)

*Primary Examiner* — Warner Wong
(74) *Attorney, Agent, or Firm* — Oblon, McClelland, Maier & Neustadt, L.L.P.

(57) ABSTRACT

A communication system configured to send data using an interference alignment scheme is disclosed herein. The disclosed communication system includes an MS and a BS. The disclosed BS sends data using a transmission beamforming matrix that minimizes intra-cell interference. The disclosed MS receives the data using a reception beamforming matrix that minimizes inter-cell interference. The BS sends information about a reference beamforming matrix to the MS, and sends a pilot signal to the MS using the reference beamforming matrix. The MS estimates an effective channel using the reference beamforming matrix, and calculates the intensity of an interference signal from an interference BS.

13 Claims, 7 Drawing Sheets

(51) Int. Cl.
  *H04B 7/04*    (2006.01)
  *H04B 7/06*    (2006.01)
(52) U.S. Cl.
  CPC ......... *H04W 28/048* (2013.01); *H04B 7/0619* (2013.01); *H04B 7/0632* (2013.01)
(58) Field of Classification Search
  USPC ........................................................ 370/252
  See application file for complete search history.

(56) References Cited

U.S. PATENT DOCUMENTS

| | | | | |
|---|---|---|---|---|
| 2009/0247181 | A1* | 10/2009 | Palanki ................. | H04L 1/0036 455/452.2 |
| 2012/0190392 | A1* | 7/2012 | Aminaka .............. | H04W 24/02 455/501 |
| 2014/0029507 | A1* | 1/2014 | Dimou ................ | H04B 7/15528 370/315 |
| 2014/0094164 | A1* | 4/2014 | Hwang ................ | H04B 7/0634 455/423 |
| 2014/0112403 | A1* | 4/2014 | Falconetti ............. | H04L 5/0035 375/260 |
| 2015/0036623 | A1* | 2/2015 | Maaref ................... | H04L 1/004 370/329 |
| 2016/0050581 | A1* | 2/2016 | Abdelmonem ....... | H04L 5/0026 370/252 |

OTHER PUBLICATIONS

Yang et al., "Opportunistic Interference Alignment for MIMO Interfering Multiple-Access Channels"; IEEE Transactions on Wireless Communications, vol. 12, No. 5, May 2013, pp. 2180-2192.

* cited by examiner

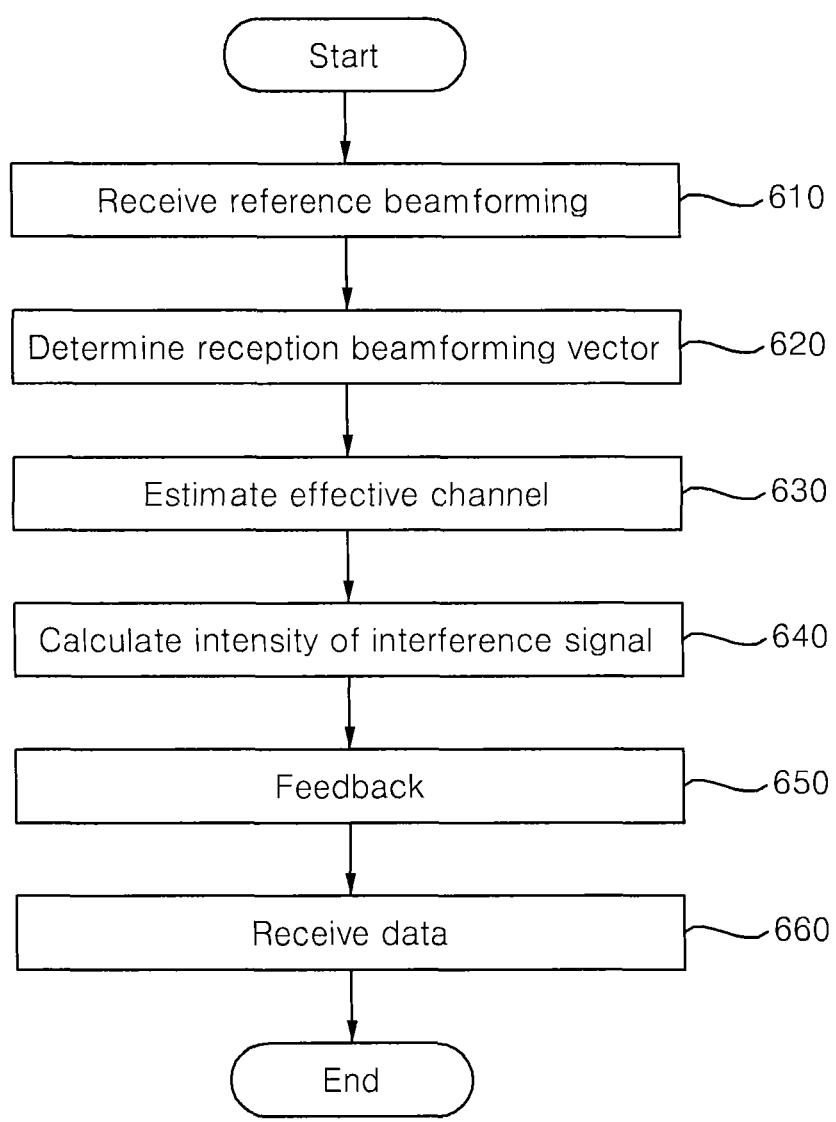

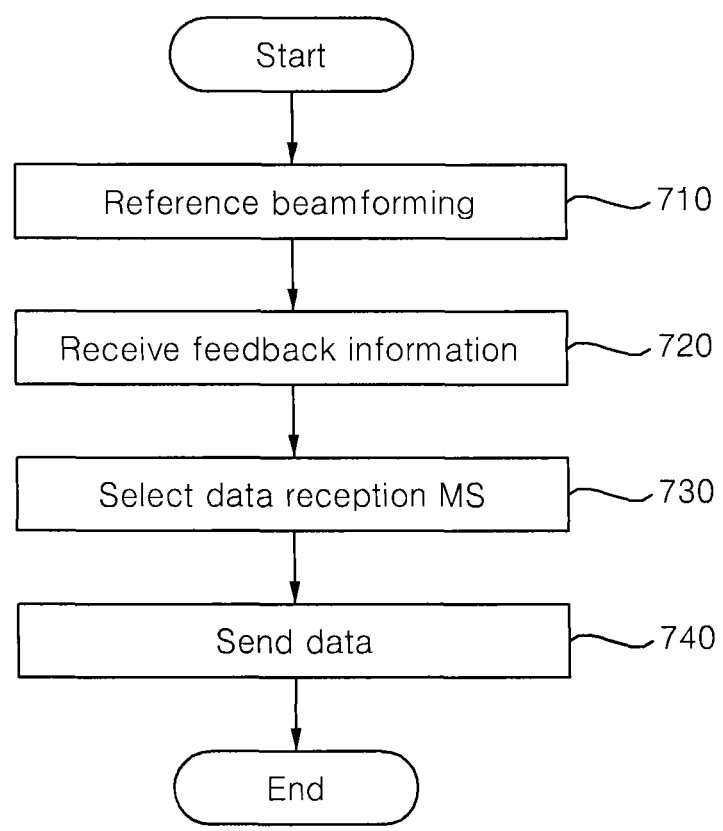

OPPORTUNISTIC DOWNLINK INTERFERENCE ALIGNMENT

CROSS-REFERENCE TO RELATED APPLICATION

This application claims the benefit of priority under 35 U.S.C. §119(a) to Korean Application No. 10-2013-0161774, filed on Dec. 23, 2013, the entirety of which is incorporated herein by reference.

TECHNICAL FIELD

The following embodiments relates to a mobile communication field and, more particularly, to an interference alignment scheme.

BACKGROUND ART

The number of signals transmitted over wireless communication networks has gradually increased over time. It is expected that in the near future, a number of signals several times the number of signals that are now being transmitted will be transmitted over wireless communication networks.

A wireless communication network may include a plurality of base stations and a plurality of terminals. A terminal may receive an interference signal from a base station adjacent to a base station that sends a signal desired by the terminal. Such an interference signal is one of the factors that deteriorate the transfer efficiency of a wireless communication network. Accordingly, there is a need for a technology that is capable of reducing or minimizing an interference signal.

SUMMARY OF THE DISCLOSURE

An object of the following embodiments is to minimize downlink interference and then send data to a terminal.

In accordance with an aspect of the present invention, there is provided a mobile station (MS) for receiving data from a serving base station (BS) using an interference alignment scheme, the MS including an interference signal intensity calculation unit configured to calculate the intensity of an interference signal received from an interference BS adjacent to the serving BS; a transmission unit configured to send the calculated intensity of the interference signal to the serving BS; and a reception unit configured to receive the data from the serving BS using an interference alignment scheme when the MS is selected as a data reception MS based on the intensity of the interference signal.

The reception unit may be further configured to receive the interference signal from the interference BS using a plurality of MS antennas and a reception beamforming vector having elements corresponding to the respective MS antennas.

The reception beamforming vector may be determined such that the intensity of the interference signal from the interference BS is minimized.

The reception unit may further configured to receive the interference signal having undergone transmission beamforming using a reference beamforming matrix of the interference BS from the interference BS; and to calculate the intensity of the interference signal using the interference signal having undergone the transmission beamforming.

The intensity of the interference signal may be compared with an intensity of a second interference signal transmitted by a second MS connected to the serving BS; and the MS may be selected as the data reception MS based on the results of the comparison.

The MS may be selected as the data reception MS when the intensity of the interference signal is lower than the intensity of the second interference signal.

The MS may further include an effective channel estimation unit configured to estimate an effective channel from a plurality of serving BS antennas of the serving BS to a plurality of MS antennas of the MS, the transmission unit may be further configured to send the effective channel to the serving BS, and the MS may be selected as the data reception MS by additionally taking the effective channel into consideration.

The reception unit may be further configured to receive a pilot signal having undergone transmission beamforming using a reference beamforming matrix of the serving BS from the serving BS; and to estimate the effective channel using the pilot signal having undergone the transmission beamforming.

The reception unit may be further configured to receive the data using a transmission beamforming matrix determined such that intra-cell interference is minimized.

In accordance with another aspect of the present invention, there is provided a serving base station (BS), including a reception unit configured to receive the intensities of interference signals, received by a plurality of mobile stations (MSs) from an interference BS adjacent to the serving BS, from the MSs; a data reception MS selection unit configured to select a data reception MS from the MSs based on the intensities of the interference signals; and a transmission unit configured to send data to the data reception MS using an interference alignment scheme.

The transmission unit may be further configured to send a pilot signal to the MSs using a reference beamforming matrix of the serving BS; the reception unit may be further configured to receive an effective channel that is estimated using the pilot signal and that extends from a plurality of serving BS antennas of the serving BS to a plurality of MS antennas of each of the MSs; and the data reception MS selection unit may be further configured to select the data reception MS by additionally taking the effective channel into consideration.

The intensities of the interference signals may be calculated based on the interference signals transmitted from the interference BS to the MSs using a reference beamforming matrix of the interference BS.

The interference signals may be determined such that the intensity of each of the interference signals from the interference BS is minimized, and may be received by the MSs using a reception beamforming vector having elements corresponding to the respective MS antennas.

The data reception MS selection unit may be further configured to select an MS having a lower interference signal intensity as the data reception MS.

The transmission unit may be further configured to send the data using a transmission beamforming matrix that is determined such that intra-cell interference is minimized.

In accordance with yet another aspect of the present invention, there is provided an MS operating method for receiving data from a serving BS using an interference alignment scheme, including calculating an intensity of an interference signal received from an interference BS adjacent to the serving BS, sending the calculated intensity of the interference signal to the serving BS, and receiving data from the serving BS using the interference alignment scheme when the MS is selected as a data reception MS based on the intensity of the interference signal.

Calculating the intensity of the interference signal may include receiving the interference signal from the interference BS using a plurality of MS antennas and a reception beamforming vector having elements corresponding to the respective MS antennas.

The reception beamforming vector may be determined such that the intensity of the interference signal from the interference BS is minimized.

Calculating the intensity of the interference signal may include receiving the interference signal having undergone transmission beamforming using the reference beamforming matrix of the interference BS from the interference BS, and calculating the intensity of the interference signal using the interference signal having undergone the transmission beamforming.

The intensity of the interference signal may be compared with the intensity of a second interference signal transmitted by a second MS connected to the serving BS, and the MS may be selected as the data reception MS based on results of the comparison.

The MS may be selected as the data reception MS when the intensity of the interference signal is lower than the intensity of the second interference signal.

The method may further include estimating an effective channel from a plurality of the serving BS antennas of the serving BS to a plurality of the MS antennas of the MS. Sending the calculated intensity of the interference signal may include sending the effective channel to the serving BS. The MS may be selected as the data reception MS by additionally taking the effective channel into consideration.

The method may further include receiving a pilot signal having undergone transmission beamforming using the reference beamforming matrix of the serving BS from the serving BS. Estimating the effective channel may include estimating the effective channel using the pilot signal having undergone the transmission beamforming.

Receiving the data from the serving BS may include receiving the data using a transmission beamforming matrix that is determined so that intra-cell interference is minimized.

In accordance with yet another aspect of the present invention, there is provided a method of operating a serving BS, including receiving intensities of interference signals, received by a plurality of MSs from an interference BS adjacent to the serving BS, from the MSs, selecting a data reception MS from the MSs based on the intensities of the interference signals, and sending data to the data reception MS using an interference alignment scheme.

Sending the data to the data reception MS may include sending a pilot signal to the MSs using the reference beamforming matrix of the serving BS. Receiving the intensities of the interference signals may include receiving an effective channel that is estimated using the pilot signal and that extends from a plurality of the serving BS antennas of the serving BS to a plurality of the MS antennas of each of the MSs. Selecting the data reception MS may include selecting the data reception MS by additionally taking the effective channel into consideration.

The intensities of the interference signals may be calculated based on the interference signals transmitted from the interference BS to the MSs using the reference beamforming matrix of the interference BS.

The interference signals may be determined such that the intensity of each of the interference signals from the interference BS is minimized and may be received by the MSs using a reception beamforming vector having elements corresponding to the respective MS antennas.

Selecting the data reception MS may include selecting an MS having a low interference signal intensity as the data reception MS.

Sending the data to the data reception MS may include sending the data using a transmission beamforming matrix determined so that intra-cell interference is minimized.

BRIEF DESCRIPTION OF THE DRAWINGS

The above and other objects, features and advantages of the present invention will be more clearly understood from the following detailed description taken in conjunction with the accompanying drawings, in which:

FIG. 6 is a flowchart illustrating the steps of the operation of the MS according to an exemplary embodiment; and FIG. 7 is a flowchart illustrating the steps of the operation of the BS according to an exemplary embodiment.

DETAILED DESCRIPTION OF THE DISCLOSURE

Hereinafter, embodiments are described in detail with reference to the accompanying drawings.

Figure 1:
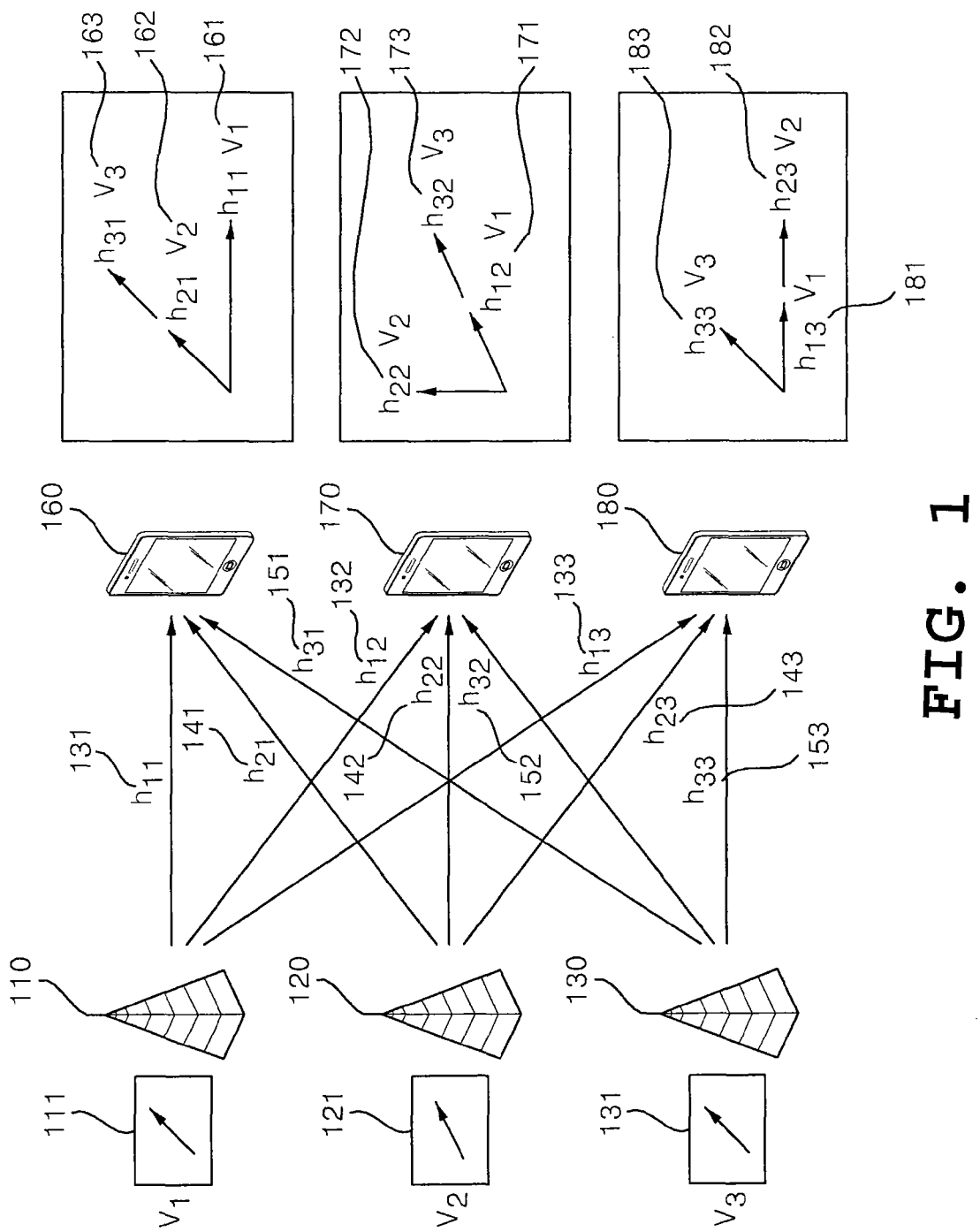
FIG. 1 is a diagram schematically illustrating an example of an interference alignment scheme.

FIG. 1 is a diagram conceptually illustrating an example of an interference alignment scheme.

FIG. 1 illustrates a communication network or a communication system including a plurality of base stations (BSs) 110, 120 and 130 and a plurality of mobile stations (MSs) 160, 170 and 180. The BS 110 is paired with the MS 160 to send a signal to the MS 160. Likewise, the BS 120 and the BS 130 are paired with the MSs 170 and 180 to send signals to the MSs 170 and 180, respectively.

A signal transmitted by each of the BSs may also be transmitted to other MSs in addition to a designated MS. FIG. 1 illustrates an example of such a situation. For example, a signal transmitted by the BS 110 may also be received by undesignated MSs 170 and 180 in addition to a designated MS 160. From the standpoint of the MS 160, the MS 160 may receive undesired signals transmitted by the BS 120 and the BS 130 along with a desired signal transmitted by the BS 110. The desired one of the signals received by each MS as described above may be called a data signal, and the undesired signals may be called interference signals. Furthermore, each of the BSs that send data signals to the respective MSs 160, 170 and 180 may be called a transmission BS, and a BS that sends an interference signal may be called an interference BS. For example, in the case of the MS 160 of FIG. 1, the BS 110 is a transmission BS, and the BSs 120 and 130 are interference BSs.

Each BS may reduce the influence of an interference signal on each MS by controlling a transmission signal. Each BS may control a transmission signal based on the state of a channel between each station and each MS.

In accordance with the embodiment illustrated in FIG. 1, the phase of a signal $V_1$ 111 transmitted by the BS 110 is changed while the signal is passing through a channel 131 between the BS 110 and the MS 160. The MS 160 receives a major signal $h_{11} V_1$ 161, that is, the signal $V_1$ whose phase has been changed while the signal $V_1$ has been passing through the channel 131. Furthermore, the MS 160 receives an interference signal $h_{21} V_2$ 162, that is, the signal $V_2$ of the BS 120 whose phase has been changed while the signal $V_2$ has been passing through a channel 141, and an interference signal $h_{31} V_3$ 163, that is, the signal $V_3$ of the BS 130 whose phase has been changed while the signal $V_3$ has been passing through a channel 151. In this case, the reception efficiency of the major signal $h_{11} V_1$ 161 at the MS 160 may be deteriorated due to the interference signal $h_{21} V_2$ 162 and the interference signal $h_{31} V_3$ 163. Likewise, the reception of a major signal $h_{22} V_2$ 172 at the MS 170 may be deteriorated due to an interference signal $h_{12} V_1$ 171 and an interference signal $h_{32} V_3$ 173. The reception of a major signal $h_{33} V_3$ 183 at the MS 180 may be deteriorated due to an interference signal $h_{13} V_1$ 181 and an interference signal $h_{23} V_2$ 182. In order to reduce or eliminate the deterioration of reception efficiency, each BS may control a transmission signal.

In the embodiment of FIG. 1, each of the MSs 160, 170 and 180 may estimate a channel state between itself and each of the BSs 110, 120 and 130 and report the estimated channel state to the BSs. That is, the MS 160 may estimate a channel state 131 between itself and the BS 110, a channel state 141 between itself and the BS 120 and a channel state 151 between itself and the BS 130 and report the estimated channel states 131, 141 and 151 to the respective BSs 110, 120 and 130. Likewise, the MS 170 may estimate channel states 132, 142 and 152 and report the estimated channel states 132, 142 and 152 to the respective BSs 110, 120 and 130. The MS 180 may estimate channel states 133, 143 and 153 and report the estimated channel states 133, 143 and 153 to the respective BSs 110, 120 and 130. Accordingly, each of the BSs 110, 120 and 130 may control a transmission signal by taking into consideration information about all the channel states 131, 141, 151, 132, 142, 152, 133, 143 and 153. In an example of controlling a transmission signal, a signal received by an MS via a channel may be precoded so that it has a specific phase.

In all the embodiments of the present specification, signals may be sent and received using a frequency division multiple access (FDMA) method, a time division multiple access (TDMA) method, a code division multiple access (CDMA) method, a frequency division duplex (FDD), or a time division duplex (TDD) method.

In the case of a TDD method, it may be assumed that the state of an uplink channel between the BS 110, 120 and 130 and the MS 160, 170 and 180 is the same as that of a downlink channel therebetween. Accordingly, each of the BSs 110, 120 and 130 may receive a pilot signal from each of the MSs 160, 170 and 180 and estimate the state of an uplink channel based on the pilot signal. Since the state of the uplink channel is the same as that of the downlink channel, information about the state of the uplink channel may be used as information about the state of the downlink channel.

An embodiment in which an FDD method is used is described in detail below with reference to FIG. 1. In the FDD method, the state of an uplink channel between each of the BSs 110, 120 and 130 and each of the MSs 160, 170 and 180 is not the same as that of a downlink channel therebetween. Accordingly, each of the MSs 160, 170 and 180 may estimate the state of a downlink channel and send the estimated state of the downlink channel to each of the BSs 110, 120 and 130. Each of the BSs 110, 120 and 130 may control a transmission signal based on the states of the downlink channels 131, 141, 151, 132, 142, 152, 133, 143 and 153 as described above.

FIG. 1 illustrates an embodiment of an interference alignment scheme of controlling a transmission signal so that interference signals received by each of the MSs have the same phase. The MS 160 receives the interference signals $h_{21} V_2$ 162 and $h_{31} V_3$ 163 in addition to the major signal $h_{11} V_1$ 161. The phase of the signal $V_2$ transmitted by the BS 120 is changed while the signal $V_2$ is being received by the MS 160 via the channel 141.

In other words, the phase of the interference signal $h_{21} V_2$ 162 is changed differently from that of the signal $V_2$. Likewise, the phase of the interference signal $h_{31} V_3$ 163 is changed differently from that of the signal $V_3$.

The BS 120 and the BS 130 may control the phases of the respective transmission signal $V_2$ 121 and transmission signal $V_3$ 131 so that the interference signal $h_{21} V_2$ 162 and the interference signal $h_{31} V_3$ 163 received by the MS 160 have the same phase. Likewise, the BS 110 and the BS 130 may control the phases of the respective transmission signal $V_1$ 111 and transmission signal $V_3$ 131 so that the interference signal $h_{12} V_1$ 171 and interference signal $h_{32} V_3$ 173 received by the MS 170 have the same phase. The BS 110 and the BS 120 may control the phases of the transmission signal $V_1$ 111 and transmission signal $V_2$ 121 so that the interference signal $h_{13} V_1$ 181 and interference signal $h_{23} V_2$ 182 received by the MS 180 have the same phase. The control of the phase of a transmission signal may be performed in such a way as to apply precoding to the transmission signal as described above.

As described above, if a plurality of interference signals received by each MS has the same phase, the MS may consider that a single interference signal transmitted with relatively high power has been received. Furthermore, if received interference signals have the same phase even when the number of interference signals is increased, an MS may consider that only a single interference signal has been received. For example, each of the MSs illustrated in FIG. 1 may treat two interference signals having the same phase as a single interference signal and eliminate the two interference signals.

An interference neutralization method is a method in which a plurality of interference BSs control the phases of transmission signals so that a plurality of interference signals received by an MS has opposite phases and send the transmission signals. As in the interference alignment scheme, when receiving interference signals to the interference neutralization method has been applied, an MS may consider the interference signals to be a single interference signal. As an example, if two interference signals have a phase difference of 180 degrees and thus have opposite phases, the sum of the two interference signals may be considered to be a single interference signal having a relatively small magnitude.

Figure 2:
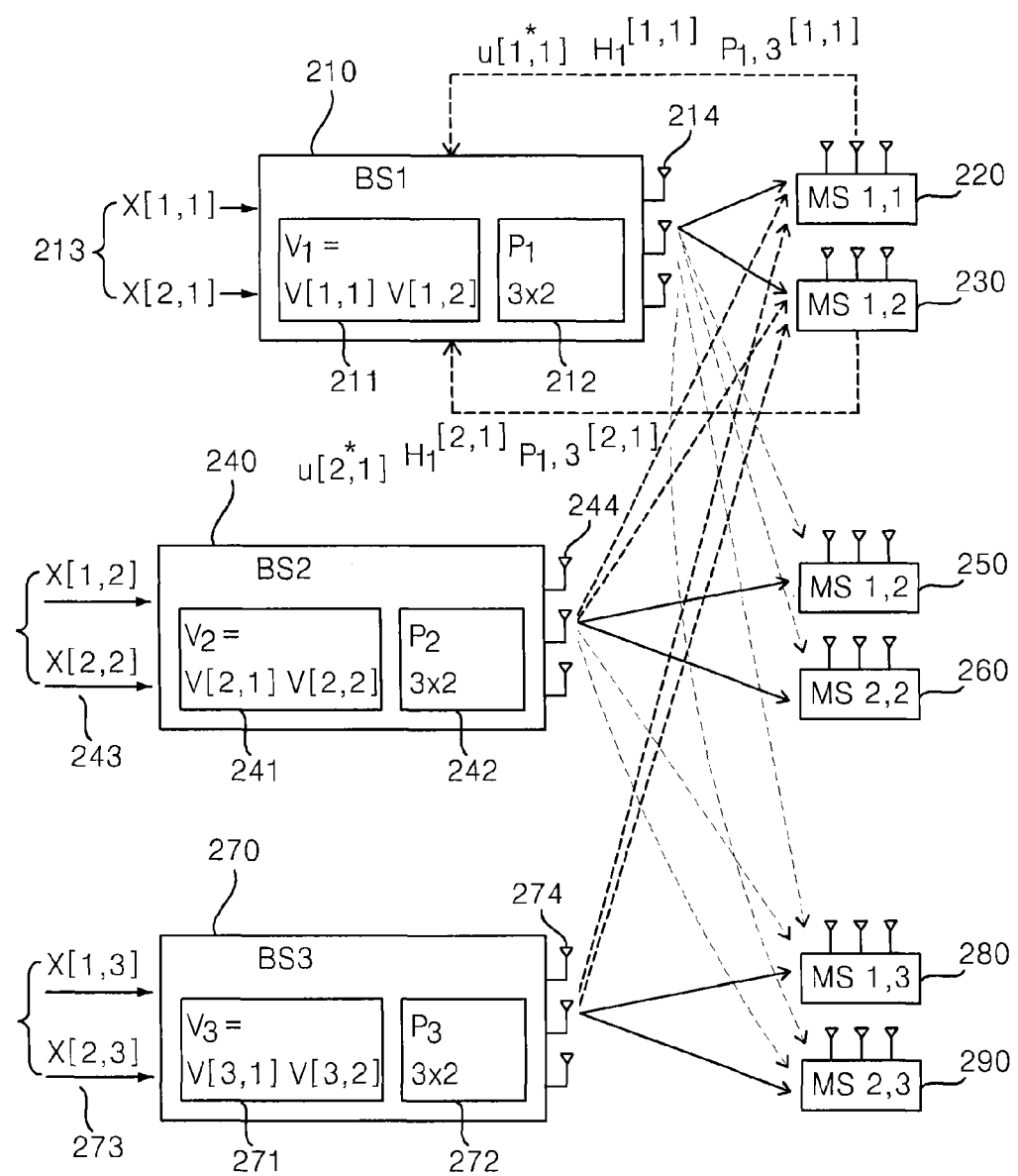
FIG. 2 is a diagram illustrating a communication system according to an exemplary embodiment.

FIG. 2 is a diagram illustrating a communication system according to an exemplary embodiment.

The communication system of FIG. 2 includes three BSs 210, 240 and 270 and six MSs 220, 230, 250, 260, 280 and 290. In FIG. 2, the first BS 210 is the serving BS of the MSs 220 and 230, and the second BS 240 is the serving BS of the MSs 250 and 260. Furthermore, the third BS 270 is the serving BS of the MSs 280 and 290.

The second BS 240 and the third BS 270 are interference BSs adjacent to the first BS 210, and send interference signals to the MSs 220 and 230 that use the first BS 210 as a serving BS.

For convenience of description, it is assumed that each of the BSs 210, 240 and 270 are equipped with M BS antennas 214, 244 or 274 and each of the MSs 220, 230, 250, 260, 280 and 290 is equipped with L MS antenna. Here, a channel from a k-th BS to the j-th MS of an i-th cell may be represented by a channel matrix $H_k^{[i,j]}$. In this case, the i-th cell uses an i-th BS as a serving BS. $H_k^{[i,j]} \in C^{L \times M}$, and the channel matrix $H_k^{[i,j]}$ may be assumed to be independently and identically distributed based on CN(0,1).

In accordance with an aspect, each of the BSs 210, 240, and 270 sends a pilot signal to the MSs 220, 230, 250, 260, 280 and 290, and each of the MSs 220, 230, 250, 260, 280 and 290 may estimate the channel matrix $H_k^{[i,j]}$ using pilot signals received from the BSs 210, 240 and 270.

If each of the BSs 210, 240, and 270 sends a pilot signal using transmission beamforming, each of the MSs 220, 230, 250, 260, 280 and 290 may estimate an effective channel by taking into consideration the influence of both the transmission beamforming and the channel matrix $H_k^{[i,j]}$.

In accordance with an aspect, a k-th BS may multiply a pilot signal by reference beamforming matrices $P_k$ 212, 242, and 272 defined by Equation 1 and send the pilot signal.

$$P_k = [P_{1,k}, \ldots, P_{s,k}] \quad (1)$$

where $P_{s,k} \in C^{M \times 1}$, and s=1, ..., S. S denotes the number of MSs that use the k-th BS as a serving BS and are also selected as data reception MSs.

In accordance with an aspect, each of the MSs 220, 230, 250, 260, 280 and 290 may receive an interference signal from an interference BS using a reception beamforming vector. Each of the MSs 220, 230, 250, 260, 280 and 290 calculates the intensity of an interference signal received from the interference BS or the sum of the intensities of interference signals received from respective interference BSs.

The reception beamforming vector of a j-th MS using an i-th BS as a serving BS may be denoted by $u^{[i,j]}$. Here, $u^{[i,j]} \in C^{L \times 1}$, and $\|u^{[i,j]}\|^2 = 1$. In this case, the intensity of an interference signal received from a k-th BS by the j-th MS using the i-th BS as a serving BS may be expressed by Equation 2 below:

$$\tilde{\eta}_k^{[i,j]} = \|u^{[i,j]H} H_k^{[i,j]} P_k\|^2 \quad (2)$$

Referring to Equation 2, the sum $\eta^{[i,j]}$ of the intensities of interference signals received from the interference BSs by the j-th MS using the i-th BS as a serving BS may be expressed by Equation 3 below:

$$\eta^{[i,j]} = \sum_{k=1, k \neq i}^{K} \tilde{\eta}_k^{[i,j]} \quad (3)$$

Each of the MSs 220, 230, 250, 260, 280 and 290 feeds the intensity of the received interference signal or the sum of the intensities of the interference signals back to its serving BS. The serving BS may select a data reception MS from the MSs based on the intensity of the received interference signal or the sum of the intensities of the interference signals.

The serving BSs may send data 213, 243 and 273 to the respective data reception MSs using the interference alignment scheme described with reference to FIG. 1. In this case, the data 213, 243 and 273 is multiplied by respective transmission beamforming matrices 211, 241 and 271 and then transmitted.

Figure 3:
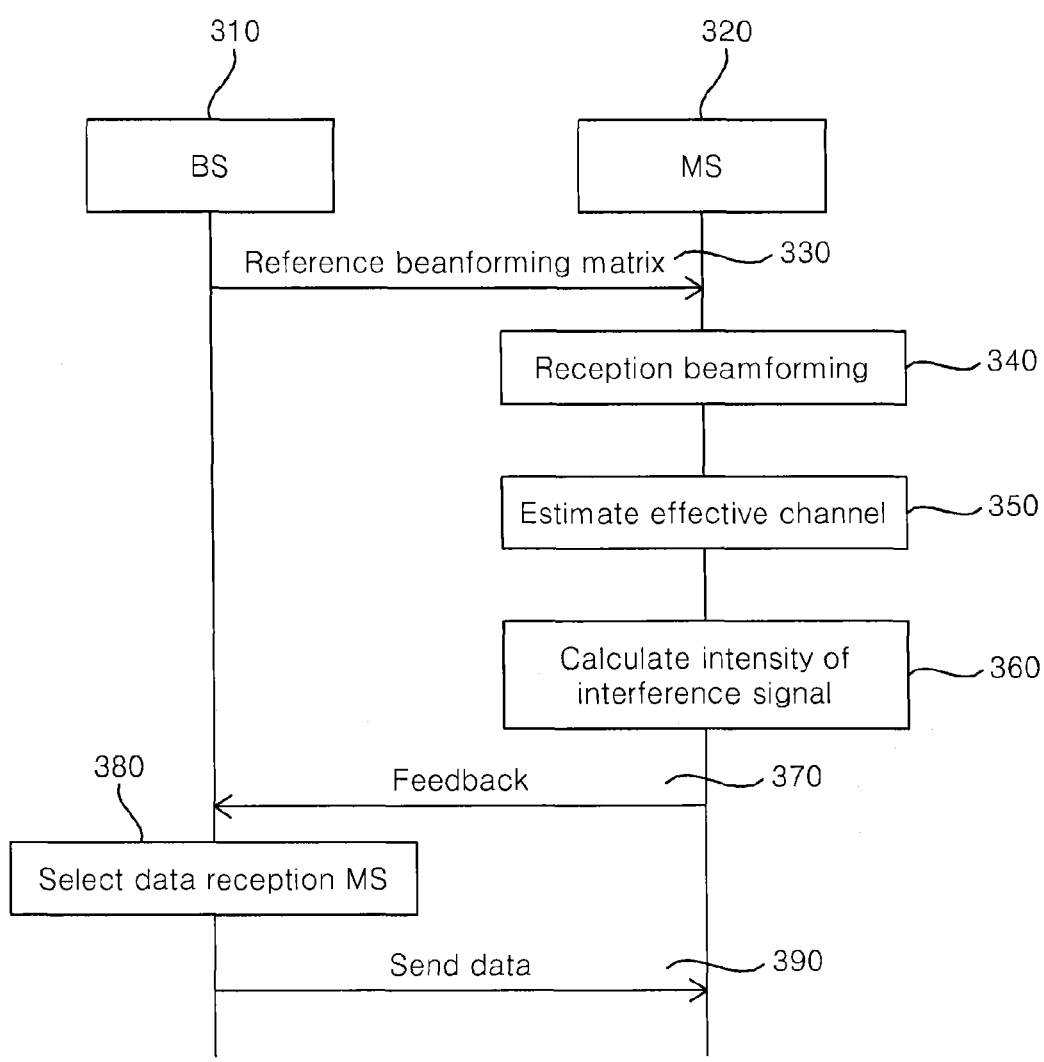
FIG. 3 is a flowchart illustrating the steps of a method of sending data according to an exemplary embodiment.

FIG. 3 is a flowchart illustrating the steps of a method of sending data according to an exemplary embodiment.

At step 330, a BS 310 broadcasts a reference beamforming matrix to an MS 320. In accordance with an aspect, the columns of the reference beamforming matrix may be vectors that are orthogonal to each other and have an orthogonal size of 1. In accordance with an aspect, the BS 310 may select vectors, isotropically distributed across an M-dimensional vector space, as the column vectors of the reference beamforming matrix, and may generate the reference beamforming matrix.

In accordance with another aspect, the BS 310 may select specific vectors having an orthogonal size of 1 as column vectors and generate the reference beamforming matrix. In this case, the BS 310 may not send the reference beamforming matrix to the MS 320.

The BS 310 performs transmission beamforming on a pilot signal using the reference beamforming matrix and sends the pilot signal having undergone the transmission beamforming to the MS 320.

At step 340, the MS 320 receives the pilot signal by performing reception beamforming.

At step 350, the MS 320 estimates an effective channel using the pilot signal that has undergone the transmission beamforming. In this case, changes in the size and phase of the pilot signal attributable to the transmission beamforming and changes in the size and phase of the pilot signal attributable to channels from the BS antennas of the BS 310 to the MS antennas of the MS 320 are reflected in the effective channel. In accordance with an aspect, the effective channel may be expressed by Equation 4 below:

$$u^{[i,j]H} H_i^{[i,j]} P_i \quad (4)$$

where $u^{[i,j]}$ is the reception beamforming vector of a j-th MS using an i-th BS as a serving BS, $H_i^{[i,j]}$ is a channel matrix from the i-th BS to the j-th MS using the i-th BS as a serving BS, and $P_i$ is the reference beamforming matrix of the i-th BS.

In accordance with an aspect, the reception beamforming vector $u^{[i,j]}$ may be determined so that the sum of the intensities of interference signals from interference BSs is minimized, as in Equation 5 below:

$$u^{[i,j]} = \arg\min_u \eta^{[i,j]} \quad (5)$$

$$= \arg\min_u \sum_{k=1, k \neq i}^{K} \|u^H H_k^{[i,j]} P_k\|^2$$

$$= \arg\min_w \|G^{[i,j]} u\|^2$$

In Equation 5, $G^{[i,j]}$ is defined as Equation 6 below:

$$G^{[i,j]} \overset{\Delta}{=} [(H_1^{[i,j]} P_1), \ldots, (H_{i-1}^{[i,j]} P_{i-1}), (H_{i+1}^{[i,j]} P_{i+1}), \ldots, (H_K^{[i,j]} P_K)]^H \in C^{(K-1)S \times L} \quad (6)$$

The SVD of $G^{[i,j]}$ may be expressed by Equation 7 below:

$$G^{[i,j]} = \Omega^{[i,j]} \Sigma^{[i,j]} V^{[i,j]H} \quad (7)$$

In Equation 7, $\Omega^{[i,j]} \in C^{(K-1) \times S \times L}$ and $V^{[i,j]} \in C^{L \times L}$. Each of $\Omega^{[i,j]}$ and $V^{[i,j]}$ includes L column vectors that are orthogonal to each other and have an orthogonal size of 1. Furthermore, $\Sigma^{[i,j]}$ is expressed by Equation 8 below:

$$\Sigma^{[i,j]} = \mathrm{diag}(\sigma_1^{[i,j]}, \ldots, \sigma_L^{[i,j]}) \quad (8)$$

where $\sigma_1^{[i,j]} \geq \ldots \geq \sigma_L^{[i,j]}$).

In this case, the reception beamforming vector $u^{[i,j]}$ in which the sum of the intensities of the interference signals from the interference BSs is minimum may be determined as in Equation 9 below:

$$u^{[i,j]} = v_L^{[i,j]} \quad (9)$$

where $v_L^{[i,j]}$ is the L-th column vector of $V^{[i,j]}$.

At step 360, the MS 320 calculates the intensity of the interference signal transmitted by the interference BS or the sum of the intensities of the interference signals transmitted by the interference BSs. In accordance with an aspect, the MS 320 may calculate the sum of the intensities of the interference signals with reference to Equation 3.

At step 370, the MS 320 feeds the calculated intensity of the interference signal or the calculated sum of the intensities of the interference signals back to the BS 310. In accordance with an aspect, the MS 320 may also feed the estimated effective channel back to the BS 310 in addition to information about the interference signals.

At step 380, the BS 310 selects a data reception MS from a plurality of MSs that use the BS 310 as a serving BS. In accordance with an aspect, the BS 310 may select the data reception MS based on information (in particular, the sum of the intensities of the interference signals) about the interference signals fed back by the respective MSs. In accordance with an aspect, the BS 310 may select the data reception MS by additionally taking into consideration the effective channel.

In accordance with an aspect, the BS 310 may select MSs, in each of which the sum of the intensities of the interference signals is small, as data reception MSs. For example, if the BS 310 selects S data reception MSs, the BS 310 may select S MSs, in each of which the sum of the intensities of the interference signals is small, as the data reception MSs.

At step 390, the BS 310 sends data to MSs selected as the data reception MSs. In accordance with an aspect, the BS 310 may multiply a data symbol $x^{[i,j]}$ by the transmission beamforming vector $v^{[i,j]}$ and then send the data symbol.

A reception vector $y^{[i,j]}$ received by a j-th data reception MS with respect to the data transmitted by an i-th BS may be expressed by Equation 10 below:

$$y^{[i,j]} = H_i^{[i,j]} x^{[i,j]} + \sum_{k=1,k\neq i}^{K} H_k^{[i,j]} P_k V_k x_k + z^{[i,j]} \quad (10)$$

$$= H_i^{[i,j]} P_i v^{[i,j]} x^{[i,j]} + \sum_{s=1,s\neq i}^{S} H_i^{[i,j]} P_i v^{[s,i]} x^{[s,i]} +$$

$$\sum_{k=1,k\neq i}^{K} H_k^{[i,j]} P_k V_k x_k + z^{[i,j]}$$

where $z^{[i,j]} \in C^{L\times 1}$, $V_i = [v_{1,i}, \ldots, v_{S,i}]$, and $v_{s,i} \in C^{S\times 1}$.

In the second expression of Equation 10, a first component is data received by a data reception MS, a second component is the intra-cell interference component of data transmitted to another data reception MS, and a third component is an inter-cell interference component received from an interference BS.

A signal $\tilde{y}^{[i,j]}$ that is received when a data reception MS receives a reception vector $y^{[i,j]}$ using a reception beamforming vector $u^{[i,j]}$ may be expressed by Equation 11 below:

$$\tilde{y}^{[i,j]} = u^{[i,j]H} H_i^{[i,j]} P_i V_i x_i + u^{[i,j]H} \cdot \sum_{k=1,k\neq i}^{K} H_k^{[i,j]} P_k V_k x_k + \quad (11)$$

$$u^{[i,j]H} z^{[i,j]}$$

$$= u^{[i,j]H} H_i^{[i,j]} P_i v^{[i,j]} x^{[i,j]} + u^{[i,j]H} H_i^{[i,j]} P_i \sum_{s=1,s\neq i}^{S} v^{[s,i]} x^{[s,i]} +$$

$$u^{[i,j]H} \sum_{k=1,k\neq i}^{K} H_k^{[i,j]} P_k V_k x_k + u^{[i,j]H} z^{[i,j]}$$

When the BS 310 performs transmission beamforming using a zero-forcing beamformer, it may be assumed that inter-cell interference is not present. That is, when the BS 310 uses a zero-forcing beamformer, the transmission beamforming matrix $V_i$ of the BS 310 may be determined as in Equation 12 below:

$$V_i = [v^{[1,i]}, v^{[2,i]}, \ldots, v^{[S,i]}] = \quad (12)$$

$$\begin{bmatrix} u^{[1,i]H} & H_i^{[1,i]} & P_i \\ u^{[2,i]H} & H_i^{[2,i]} & P_i \\ & \vdots & \\ u^{[S,i]H} & H_i^{[S,i]} & P_i \end{bmatrix}^{-1} \begin{bmatrix} \sqrt{\gamma_1} & 0 & \ldots & 0 \\ 0 & \sqrt{\gamma_2} & \ldots & 0 \\ \vdots & \vdots & \ddots & \vdots \\ 0 & 0 & \ldots & \sqrt{\gamma_S} \end{bmatrix}$$

where $V_i \in C^{S\times S}$, and $\sqrt{\gamma_j}$ is a normalization factor based on the transmission power of the BS.

Referring to Equation 12, the reception signal $\tilde{y}^{[i,j]}$ represented by Equation 11 may be expressed by Equation 13 below:

$$\tilde{y}^{[i,j]} = \sqrt{\gamma_j} x^{[i,j]} + u^{[i,j]H} \sum_{k=1,k\neq i}^{K} H_k^{[i,j]} P_k V_k x_k + u^{[i,j]H} z^{[i,j]} \quad (13)$$

In Equation 13, a first component is a data component received by the data reception MS, a second component is an inter-cell interference component received by the data reception MS from the interference BS, and a third component is a noise component.

In this case, if the reception beamforming vector $u^{[i,j]}$ of the data reception MS is determined so that the sum of the intensities of the interference signals received from the interference BSs is minimized as in Equation 9, the influence of the interference signals in Equation 13 is minimized.

Figure 4:
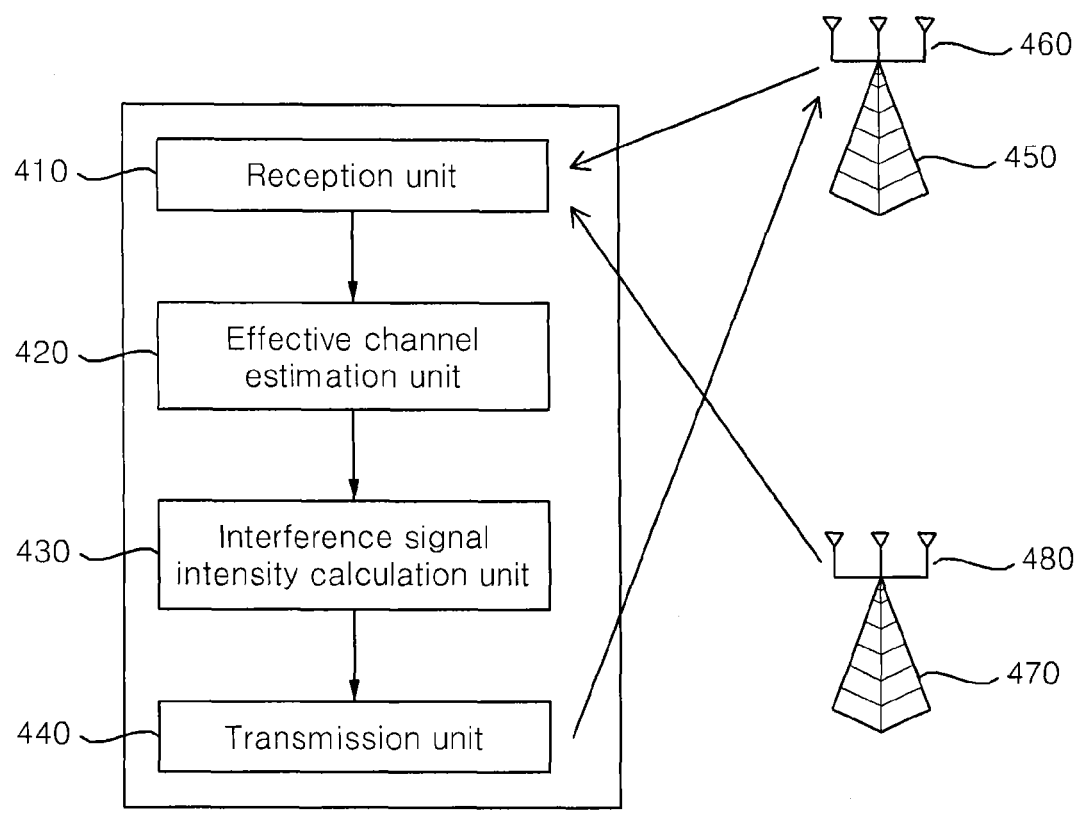
FIG. 4 is a block diagram illustrating the configuration of an MS according to an exemplary embodiment.

FIG. 4 is a block diagram illustrating the configuration of an MS according to an exemplary embodiment.

The MS 400 according to an exemplary embodiment includes a reception unit 410, an effective channel estimation unit 420, an interference signal intensity calculation unit 430, and a transmission unit 440.

The reception unit 410 receives a pilot signal from a serving BS 450, and receives a pilot signal from an interference BS 470. In accordance with an aspect, the pilot signals received from the serving BS 450 and the interference BS 470 may have undergone transmission beamforming using respective reference beamforming matrices determined by the BSs 450 and 470.

In accordance with an aspect, the reception unit 410 may receive the pilot signals from the serving BS 450 and the interference BS 470 using a reception beamforming vector. The elements of the reception beamforming vector correspond to respective MS antennas. In this case, the reception beamforming vector may be determined as in Equation 9 so that the inter-cell interference from the interference BS is minimized.

The effective channel estimation unit 420 may estimate an effective channel from a plurality of serving BS antennas 460 included in the serving BS 450 to a plurality of MS antennas included in the MS 400. Changes in the size and phase of a pilot signal attributable to transmission beamforming and changes in the size and phase of the pilot signal attributable to channels from the serving BS antennas to the MS antennas are reflected in the effective channel.

The interference signal intensity calculation unit 430 calculates the intensity of the interference signal received from the interference BS 470. Furthermore, the interference signal intensity calculation unit 430 may calculate the sum of the intensities of interference signals received from a plurality of interference BSs.

The transmission unit 440 sends the calculated intensity of the interference signal to the serving BS 450. In accordance with an aspect, the transmission unit 440 may send the sum of the intensities of the interference signals, received from the plurality of interference BSs, to the serving BS 450.

In accordance with an aspect, the MS 400 may be selected as a data reception MS based on the intensity of the interference signal or the sum of the intensities of the interference signals transmitted to the serving BS 450.

In accordance with an aspect, a second MS also connects with the serving BS 450. Furthermore, the second MS receives a second interference signal from the interference BS 470, calculates the intensity of the received second interference signal, and feeds the calculated intensity of the received second interference signal back to the serving BS 450. If the second MS has received second interference signals from a plurality of interference BSs, the second MS may calculate the sum of the intensities of the received second interference signals and feed the calculated sum back to the serving BS 450.

The intensity of the interference signal or the sum of the intensities of the interference signals transmitted to the serving BS 450 may be compared with the intensity of the second interference signal or the sum of the intensities of the second interference signals received by the serving BS 450 from the second MS. In this case, the MS 400 may be selected as the data reception MS based on the results of the comparison.

In accordance with an aspect, if the intensity of the interference signal is lower than that of the second interference signal, the MS 400 may be selected as the data reception MS. Alternatively, if the sum of the intensities of the interference signals is lower than that of the intensities of the second interference signals, the MS 400 may be selected as the data reception MS.

In accordance with an aspect, the transmission unit 440 may send the estimated effective channel to the serving BS 450. In this case, the serving BS 450 may select the data reception MS by further taking into consideration the effective channel.

In order to send the accurate value of an effective channel, many uplink resources should be used. In order to efficiently use uplink resources and send the value of an effective channel, the transmission unit 440 may consider a codebook, such as Equation 14 below;

$$C_f = \{c_1, \ldots, c_{N_f}\} \quad (14)$$

where $N_f$ is the size of a codebook, $c_k \in C^{S \times 1}$, and $c_k$ is codewords having a size of 1.

The effective channel may be expressed by Equation 15 below:

$$f^{[i,j]H} = u^{[i,j]H} H_i^{[i,j]} P_i \quad (15)$$

In this case, each MS may quantize the effective channel using the codebook $C_f$ as in Equation 16 below:

$$\hat{f}^{[i,j]} = \arg\max_{\{w = c_k : 1 \leq k \leq N_f\}} \frac{|f^{[i,j]H} w|^2}{\|f^{[i,j]}\|^2} \quad (16)$$

The transmission unit 440 may send 1) the index of the quantized effective channel and 2) the size of the effective channel. In this case, the size of the effective channel may be defined as $\|f^{[i,j]}\|^2$.

If the MS 400 has been selected as a data reception MS, the reception unit 410 may receive data from the serving BS 450 using the interference alignment scheme. In this case, the serving BS 450 may determine a transmission beamforming matrix so that intra-cell interference is minimized, and then may send the data using the determined transmission beamforming matrix.

Figure 5:
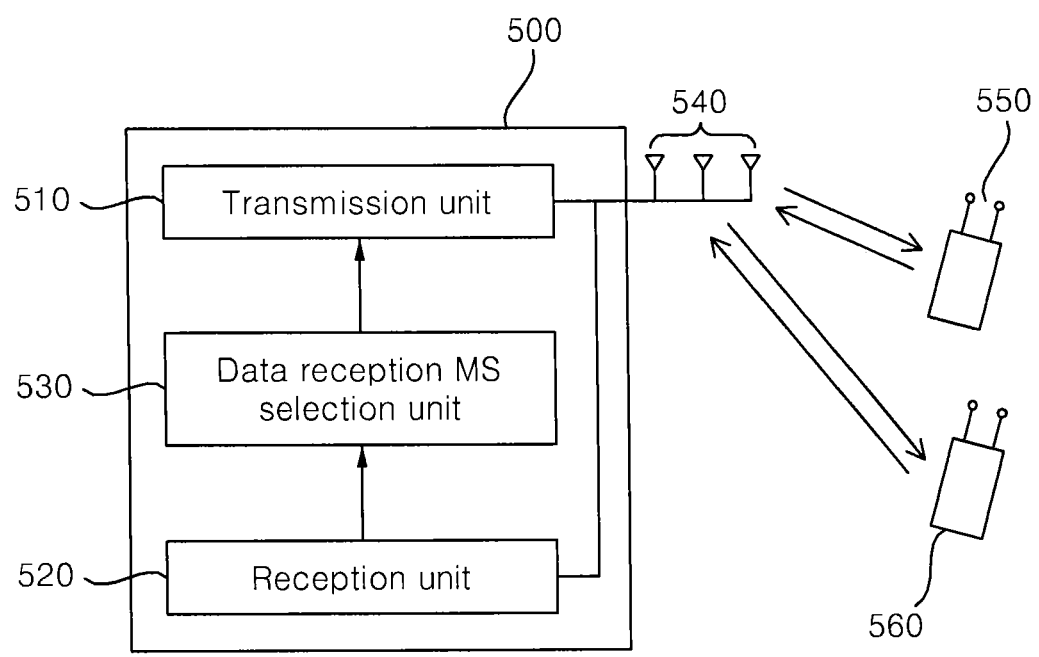
FIG. 5 is a block diagram illustrating the configuration of a BS according to an exemplary embodiment.

FIG. 5 is a block diagram illustrating the configuration of a BS according to an exemplary embodiment.

The BS 500 according to an exemplary embodiment includes a transmission unit 510, a data reception MS selection unit 530, and a reception unit 520

The transmission unit 510 sends a pilot signal to MSs 550 and 560. In accordance with an aspect, the transmission unit 510 may perform transmission beamforming using a plurality of BS antennas 540 and a reference beamforming matrix, and then may send the pilot signal having undergone the transmission beamforming to the MSs 550 and 560. In accordance with an aspect, the columns of the reference beamforming matrix may be respective vectors that are orthogonal to each other and have an orthogonal size of 1. In accordance with an aspect, the columns of the reference beamforming matrix may be respective vectors isotropically distributed across an M-dimensional vector space. In this case, information about the reference beamforming matrix may be transmitted to the MSs 550 and 560 prior to the transmission of the pilot signal. Each of the MSs 550 and 560 may estimate an effective channel using the information about the reference beamforming matrix.

In accordance with another aspect, the BS 500 may select specific vectors having a size of 1 as column vectors and generate the reference beamforming matrix. In this case, the transmission unit 510 may not send the reference beamforming matrix to the MSs 550 and 560.

In accordance with an aspect, each of the MSs 550 and 560 may receive the pilot signal from the BS 500 and an interference signal from an interference BS using a reception beamforming vector. In this case, the reception beamforming vector may be determined so that the intensity of the interference signal from the interference BS is minimized. Furthermore, the elements of the reception beamforming vector correspond to respective MS antennas.

Each of the MSs 550 and 560 receives the interference signal having undergone the transmission beamforming from the interference BS using the reference beamforming matrix. Each of the MSs 550 and 560 may calculate the intensity of the interference signal received from the interference BS or the sum of the intensities of interference signals received from interference BSs using the reference beamforming matrix received from the interference BS.

The reception unit 520 receives the calculated intensity of the interference signal or the calculated sum of the intensities of the interference signals from each of the MSs 550 and 560. Furthermore, the reception unit 520 may receive estimated effective channels from the MSs 550 and 560.

The data reception MS selection unit 530 selects a data reception MS from the MSs 550 and 560 based on the intensity of the interference signal or the sum of the intensities of the interference signals received from each of the MSs 550 and 560. In accordance with an aspect, the data reception MS selection unit 530 may select the data reception MS from the MSs 550 and 560 based on the intensity of the interference signal or the sum of the intensities of the interference signals. For example, the data reception MS selection unit 530 may select an MS, which belongs to the MSs 550 and 560 and has a lower interference signal intensity or a lower interference signal intensity sum, as the data reception MS.

In accordance with an aspect, the data reception MS selection unit 530 may select the data reception MS by additionally taking into consideration the effective channel in addition to the intensity of the interference signal or the sum of the intensities of the interference signals.

The transmission unit 510 sends data to the data reception MS using the plurality of BS antennas 540. In accordance with an aspect, the transmission unit 510 may send the data to the data reception MS using the interference alignment scheme. In this case, a transmission beamforming matrix used by the transmission unit 510 in order to apply the interference alignment scheme to the transmission of the data may be determined such that intra-cell interference is minimized. In accordance with an aspect, the transmission beamforming matrix may be determined using a zero-forcing beamformer.

FIG. 6 is a flowchart illustrating the steps of the operation of the MS according to an exemplary embodiment.

At step 610, the MS receives the reference beamforming matrix of a serving BS from the serving BS. Furthermore, the MS receives the reference beamforming matrix of an interference BS from the interference BS.

At step 610, the MS receives a pilot signal having undergone transmission beamforming from the serving BS using the reference beamforming matrix of the serving BS. Furthermore, the MS receives an interference signal having undergone transmission beamforming from the interference BS using the reference beamforming matrix of the interference BS.

At step 620, the MS determines a reception beamforming vector. In accordance with an aspect, the MS may determine the reception beamforming vector so that inter-cell interference from the interference BS is minimized. The MS may receive the pilot signal from the serving BS using the reception beamforming vector and receive the interference signal from the interference BS using the reception beamforming vector.

At step 630, the MS estimates an effective channel from the serving BS antennas of the serving BS to the MS antennas of the MS.

At step 640, the MS calculates the intensity of the interference signal received from the interference BS. In accordance with an aspect, the MS may receive interference signals from a plurality of respective interference BSs and calculate the sum of the intensities of the received interference signals.

At step 650, the MS may send the intensity of the interference signal received from the interference BS or the sum of the intensities of the interference signals received from the interference BSs to the serving BS. In accordance with an aspect, the MS may additionally send an effective channel to the serving BS.

The serving BS may receive the intensity of an interference signal from each of a plurality of MSs or the sum of the intensities of interference signals from each of the plurality of MSs. In this case, the serving BS may select a data reception MS from the plurality of MSs based on the intensity of the interference signal or the sum of the intensities of the interference signals.

In accordance with an aspect, the serving BS may select an MS having a lower interference signal intensity or a lower interference signal intensity sum as the data reception MS.

At step 660, the MS selected as the data reception MS may receive data from the serving BS. In accordance with an aspect, the data reception MS may receive the data to which the interference alignment scheme has been applied. In this case, a transmission beamforming matrix used by the serving BS in order to apply the interference alignment scheme to the transmission of the data may be determined such that intra-cell interference is minimized.

FIG. 7 is a flowchart illustrating the steps of the operation of the BS according to an exemplary embodiment.

At step 710, the BS sends the reference beamforming matrix of the BS to an MS. In accordance with an aspect, an interference BS adjacent to the BS sends the reference beamforming matrix of the interference BS to the MS.

At step 710, the BS performs transmission beamforming on a pilot signal using the reference beamforming matrix of the BS, and then sends the pilot signal having undergone the transmission beamforming to the MS. Furthermore, the interference BS performs transmission beamforming on an interference signal using the reference beamforming matrix of the interference BS, and then sends the interference signal having undergone the transmission beamforming to the MS.

The MS receives the pilot signal transmitted by the BS and the interference signal transmitted by the interference BS using a reception beamforming vector. In accordance with an aspect, the reception beamforming vector may be determined such that the intensity of the interference signal transmitted by the interference BS is minimized.

The MS estimates an effective channel from the BS antennas of the BS to the MS antennas of the MS using the received pilot signal. Furthermore, the MS calculates the intensity of the interference signal received from the interference BS. If the MS has received interference signals from a plurality of interference BSs, the MS may calculate the sum of the intensities of the received interference signals.

At step 720, the BS receives feedback information from the MS. In this case, the feedback information received by the BS from the MS may include the effective channel estimated by the MS. Furthermore, the feedback information received by the BS from the MS may include the intensity of the interference signal or the sum of the intensities of the interference signals.

At step 730, the BS may select a data reception MS from a plurality of MSs. In accordance with an aspect, the BS may select the data reception MS based on feedback information received from each of the MSs.

For example, the BS may select an MS having the lowest interference signal intensity as the data reception MS or may select an MS having the lowest interference signal intensity sum as the data reception MS.

At step 740, the BS may send data to the data reception MS. In accordance with an aspect, the BS may send the data to the data reception MS using the interference alignment scheme. In this case, a transmission beamforming matrix used by the BS in order to apply the interference alignment scheme to the transmission of the data may be determined such that intra-cell interference is minimized. In accordance with an aspect, the transmission beamforming matrix may be determined using a zero-forcing beamformer.

In accordance with the disclosed embodiments, downlink interference can be minimized and then data can be transmitted to an MS.

The method of providing a medical image according to an embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

As described above, although the embodiments have been described in connection with the limited embodiments and the drawings, those skilled in the art may modify and change the embodiments from the description in various ways. For example, appropriate results can be achieved even when the aforementioned descriptions are performed in order different from that of the described method and/or even when the elements of a system, structure, apparatus, circuit, etc. are coupled or combined in a form different from that of the described method or replaced with other elements or equivalents.

Accordingly, other implementations, other embodiments, and the equivalents of the claims pertain to the scope of the claims.

What is claimed is:

1. A mobile station (MS) for receiving data from a serving base station (BS) using an interference alignment scheme, the MS comprising:
an interference signal intensity calculation circuit configured to calculate an intensity of an interference signal received from an interference BS adjacent to the serving BS;
a transmission circuit configured to send the calculated intensity of the interference signal to the serving BS; and
a reception circuit configured to receive the data from the serving BS using an interference alignment scheme when the MS is selected as a data reception MS based on the intensity of the interference signal, wherein
the intensity of the interference signal is compared with an intensity of a second interference signal transmitted by a second MS connected to the serving BS, and
the MS is selected as the data reception MS based on results of the comparison.

2. The MS of claim 1, wherein the reception circuit is further configured to receive the interference signal from the interference BS using a plurality of MS antennas and a reception beamforming vector having elements corresponding to the respective MS antennas.

3. The MS of claim 2, wherein the reception beamforming vector is determined such that the intensity of the interference signal from the interference BS is minimized.

4. The MS of claim 1, wherein the reception circuit is further configured to:
receive the interference signal having undergone transmission beamforming using a reference beamforming matrix of the interference BS from the interference BS; and
calculate the intensity of the interference signal using the interference signal having undergone the transmission beamforming.

5. The MS of claim 1, wherein the MS is selected as the data reception MS when the intensity of the interference signal is lower than the intensity of the second interference signal.

6. The MS of claim 1, further comprising an effective channel estimation circuit configured to estimate an effective channel from a plurality of serving BS antennas of the serving BS to a plurality of MS antennas of the MS, wherein the transmission circuit is further configured to send the effective channel to the serving BS, and wherein the MS is selected as the data reception MS by additionally taking the effective channel into consideration.

7. The MS of claim 6, wherein the reception circuit is further configured to:
receive a pilot signal having undergone transmission beamforming using a reference beamforming matrix of the serving BS from the serving BS; and
estimate the effective channel using the pilot signal having undergone the transmission beamforming.

8. The MS of claim 1, wherein the reception circuit is further configured to receive the data using a transmission beamforming matrix determined such that intra-cell interference is minimized.

9. A serving base station (BS), comprising:
a reception circuit configured to receive intensities of interference signals, received by a plurality of mobile stations (MSs) from an interference BS adjacent to the serving BS, from the MSs;
a data reception MS selection circuit configured to select a data reception MS from the MSs based on the intensities of the interference signals; and
a transmission circuit configured to send data to the data reception MS using an interference alignment scheme, wherein
the data reception MS selection circuit is further configured to select an MS having a lower interference signal intensity as the data reception MS.

10. The serving BS of claim 9, wherein:
the transmission circuit is further configured to send a pilot signal to the MSs using a reference beamforming matrix of the serving BS;
the reception circuit is further configured to receive an effective channel that is estimated using the pilot signal and that extends from a plurality of serving BS antennas of the serving BS to a plurality of MS antennas of each of the MSs; and
the data reception MS selection circuit is further configured to select the data reception MS by additionally taking the effective channel into consideration.

11. The serving BS of claim 9, wherein the intensities of the interference signals are calculated based on the interference signals transmitted from the interference BS to the MSs using a reference beamforming matrix of the interference BS.

12. The serving BS of claim 11, wherein the interference signals are determined such that the intensity of each of the interference signals from the interference BS is minimized, and are received by the MSs using a reception beamforming vector having elements corresponding to the respective MS antennas.

13. The serving BS of claim 9, wherein the transmission circuit is further configured to send the data using a transmission beamforming matrix that is determined such that intra-cell interference is minimized.

* * * * *